(12) United States Patent
Zhang et al.

(10) Patent No.: US 7,930,343 B2
(45) Date of Patent: Apr. 19, 2011

(54) SCALABLE USER INTERFACE SYSTEM

(75) Inventors: Rui Zhang, Beijinh (CN); Michelle Raymond, Minneapolis, MN (US); Changbo Sun, Chayang District (CN); Daoping Zhang, Morristown, NJ (US); Conrad Bruce Beaulieu, Duluth, MN (US); John Hajdukiewicz, Florham Park, NJ (US)

(73) Assignee: Honeywell International Inc., Morristown, NJ (US)

( * ) Notice: Subject to any disclaimer, the term of this patent is extended or adjusted under 35 U.S.C. 154(b) by 293 days.

(21) Appl. No.: 12/122,242

(22) Filed: May 16, 2008

(65) Prior Publication Data

US 2009/0288013 A1 Nov. 19, 2009

(51) Int. Cl.
*G06F 15/16* (2006.01)
(52) U.S. Cl. ........ 709/203; 709/201; 709/202; 709/219; 709/223; 705/7; 345/746
(58) Field of Classification Search .......... 709/201–203; 345/746, 864; 705/7
See application file for complete search history.

(56) References Cited

U.S. PATENT DOCUMENTS

| | | | | |
|---|---|---|---|---|
| 6,185,625 B1 * | 2/2001 | Tso et al. | | 709/247 |
| 6,542,740 B1 * | 4/2003 | Olgaard et al. | | 455/432.1 |
| 6,687,745 B1 * | 2/2004 | Franco et al. | | 709/219 |
| 7,093,017 B1 * | 8/2006 | Olgaard et al. | | 709/227 |
| 7,263,663 B2 * | 8/2007 | Ballard et al. | | 715/762 |
| 7,440,996 B2 * | 10/2008 | Gebhart | | 709/203 |
| 7,577,907 B2 * | 8/2009 | Vishnia-Shabtai et al. | ... | 715/255 |
| 7,644,390 B2 * | 1/2010 | Khodabandehloo et al. | . | 717/105 |
| 2003/0063120 A1 * | 4/2003 | Wong et al. | | 345/746 |
| 2003/0093551 A1 * | 5/2003 | Taylor et al. | | 709/237 |
| 2003/0149754 A1 * | 8/2003 | Miller et al. | | 709/223 |
| 2003/0158915 A1 * | 8/2003 | Gebhart | | 709/219 |
| 2004/0019670 A1 * | 1/2004 | Viswanath | | 709/223 |
| 2004/0062245 A1 * | 4/2004 | Sharp et al. | | 370/392 |
| 2004/0075683 A1 * | 4/2004 | Savage | | 345/741 |
| 2004/0162872 A1 * | 8/2004 | Friedman et al. | | 709/203 |
| 2004/0187090 A1 * | 9/2004 | Meacham | | 717/103 |
| 2004/0267694 A1 * | 12/2004 | Sakai et al. | | 707/1 |
| 2006/0101068 A1 * | 5/2006 | Stuhec et al. | | 707/103 R |
| 2006/0158385 A1 * | 7/2006 | Etelapera | | 345/31 |
| 2006/0168454 A1 * | 7/2006 | Venkatachary et al. | ...... | 713/182 |

* cited by examiner

*Primary Examiner* — Wing F Chan
*Assistant Examiner* — Razu A Miah
(74) *Attorney, Agent, or Firm* — Kermit D. Lopez; Luis M. Ortiz; Kris T. Fredrick

(57) ABSTRACT

Methods and apparatus are provided for a scalable user interface system. A user interface is divided into general reusable user interface components and application specific user interface components. Next profiles are created for user interfaces based upon server capabilities and client side device capabilities and reusable user interface components are built for use in multiple profiles. Defined user interface scalability strategies are executed at runtime to build a user interface description using the user interface components. In this way, a user interface can be built from a user interface description by apportioning the building of the user interface description between a server and a client side device using the profiles. At the server, user interface components stored in memory are used to build a first portion of the user interface description while a second portion of the user interface description is built at the client side device and is combined with the first portion received from the server.

6 Claims, 5 Drawing Sheets

SCALABLE USER INTERFACE SYSTEM

FIELD OF THE INVENTION

The present invention generally relates to user interfaces for use on computer systems and more particularly relates to a user interface that is scalable responsive to the capabilities of available servers and client side devices.

BACKGROUND OF THE INVENTION

User interfaces (UIs) are employed by contemporary computer systems as a way to convey information to and receive instructions from users. It is typical in computer systems to employ a server environment and have various client side devices that interact with the server side of the computer system. As computer systems are expanded and new equipment is added, it is common for a computer system to evolve into arrangement of servers having various levels of memory, processing power and other capabilities. Moreover, client side devices can have many different levels of capability due to personal user choice in which devices are used including wireless devices that have greatly reduced computing power and streamlined applications as compared to that resident in a desktop or laptop computer.

As new client side devices come online in a computer system, application designers and developers are constantly required to rewrite user interfaces to various applications to support these new devices. Often, this level of maintenance is so labor intensive and expensive that many designers and developers opt for a least common denominator approach offering only the most minimal common functionalities that the user interface can support. Obviously, this approach does not offer a rich and fully functional user interface to a user and new and often expensive capabilities in the servers or client side devices are not utilized.

Accordingly, it is desirable to have a scalable user interface that can automatically adapt to the available capabilities of the server environment and the client side devices in a computer system. In addition, it is desirable to have a scalable user interface that more readily allows new client side devices to be supported without the labor intensive developer support common in contemporary computer systems. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for a scalable user interface system. The apparatus supports a plurality of client side devices which may have different capabilities and may support a plurality of servers which may have different capabilities. The servers include a user interface generator responsive to a user interface description to apportion the building of the user interface at the server or at the client side device based upon one more profiles comprising user interface scalability strategies.

A method is provided for a scalable user interface. The method comprises receiving a user interface description defining a user interface to be built and apportioning the building of the user interface description between a server and a client side device responsive to one or more profiles based upon the server capabilities and the client side device capabilities. User interface components stored on the server are used to build a first portion of the user interface description at the server while a second portion of the user interface description may be built at the client side device and combined with the first portion received from the server to build the user interface.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
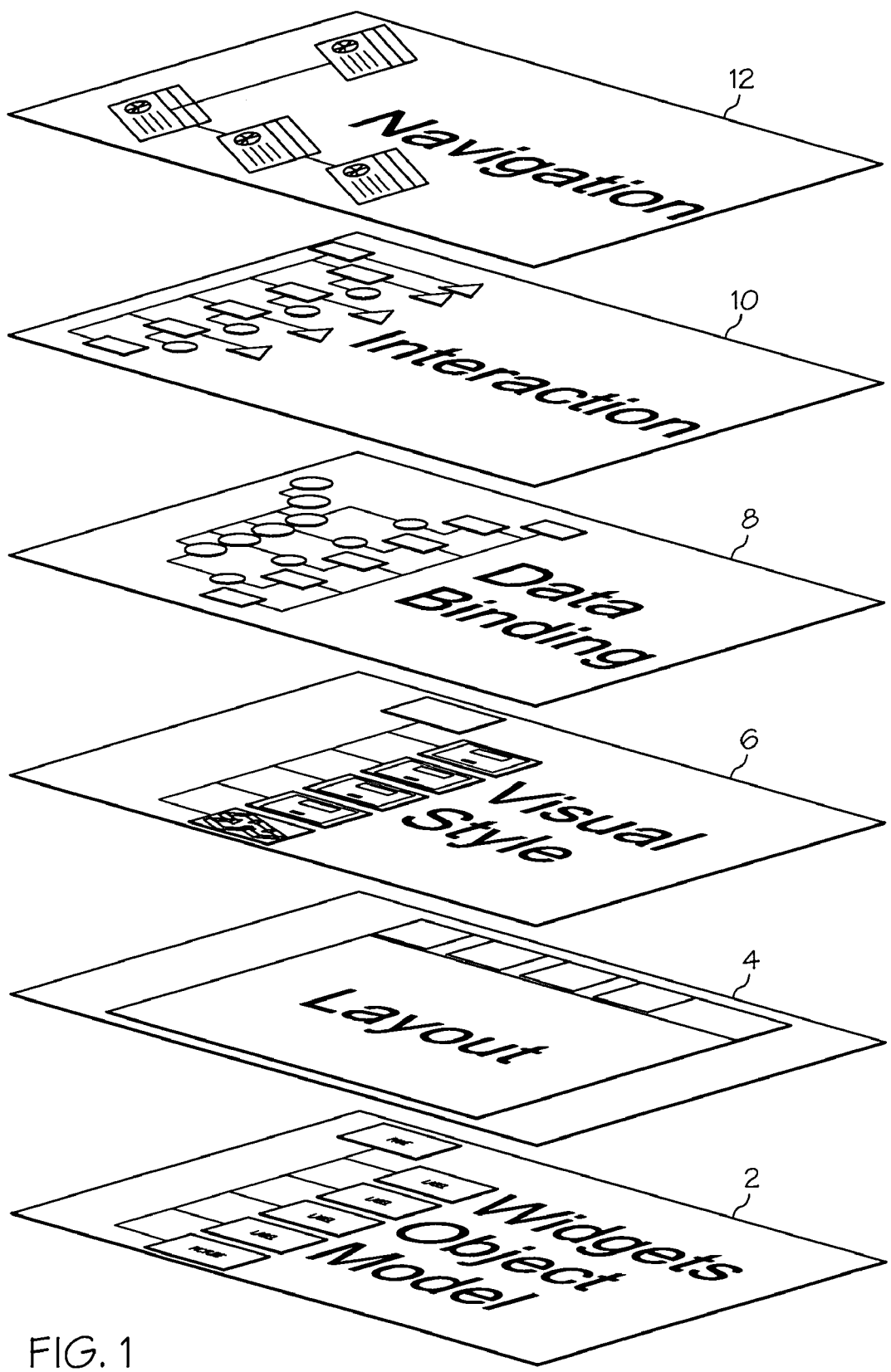
FIG. 1 is an illustration of user interface aspects in accordance with an embodiment the present invention.

FIG. 1 is an illustration of a user interface divided into general reusable components in accordance with an embodiment of the present invention. In one preferred embodiment six different components are differentiated, however, other arrangements are possible and are within the scope of the present invention. As seen in FIG. 1 the preferred arrangement is to have a widget object component 2, a layout component 4, a visual style component 6, a data binding component 8, an interaction component 10 and a navigation component 12. Additionally, it is possible that application specific user interface components may reside at the server or in the client side device that can be called upon for support in building any particular user interface or for interaction handling via the user interface. Each reusable component has a particular function and each component will be discussed below.

Figure 2:
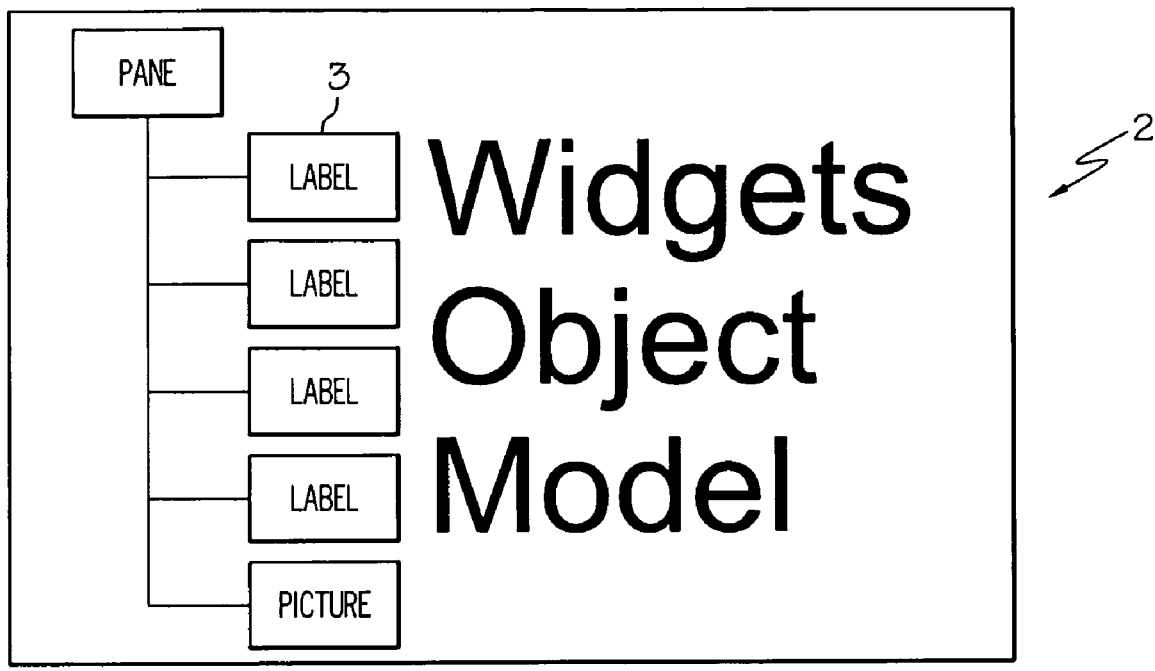
FIG. 2 is an illustration of a widget object model aspect of the user interface in accordance with an embodiment the present invention.

In FIG. 2, the widget object model 2 is illustrated. Generally, the widget object model is the skeleton of the user interface to be built and it contains the capabilities of objects or things shown to a user in the user interface world. Normally, it will represent some data and/or receive a user's input. The widget object model is contemplated by the present invention to include a plurality of labels 3 that can be linked to date selection, a title, text, pictures or images or any other basic building block of a user interface.

Figure 3:
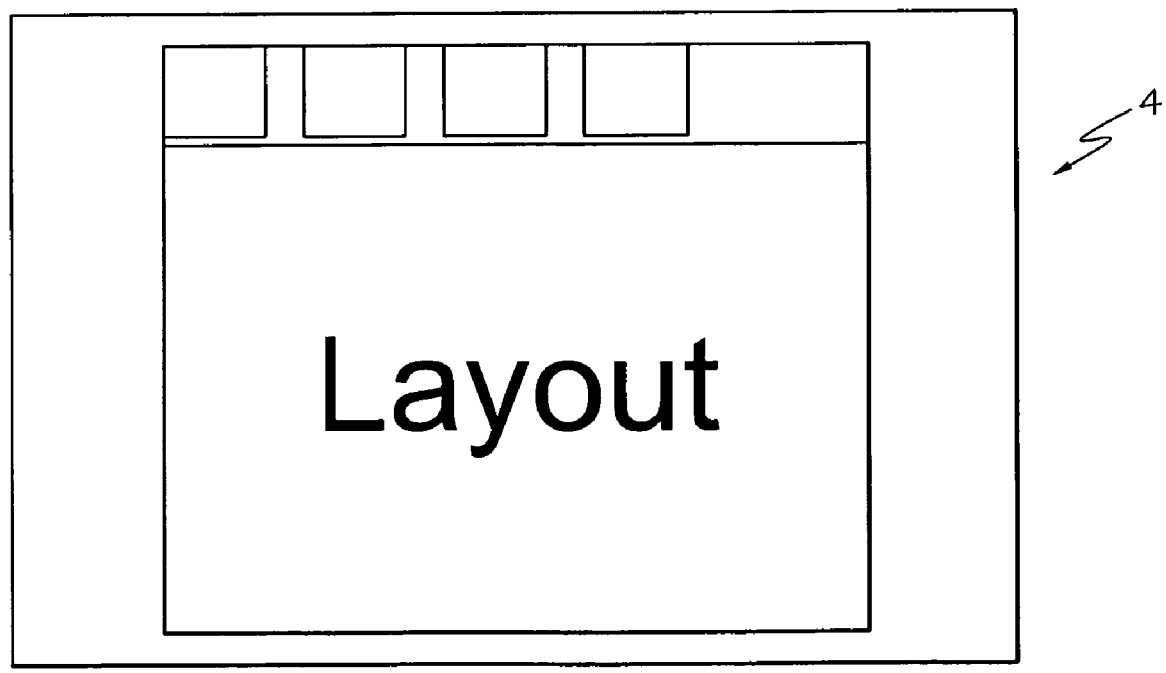
FIG. 3 is an illustration of a layout aspect of the user interface in accordance with an embodiment the present invention.

In FIG. 3, the layout component 4 is illustrated. In an embodiment of the present invention, there are two types of layout arrangements. First is the position and size information for each widget within the widget object model component 2. Second, dynamic layout constraints (e.g., motion, rotation or highlighting) can be applied to widgets within the widget object model component. According to the present invention the layout component can be particularly useful for branding purposes or to present a brand layout experience to the user. The present invention is not limited to any particular layout, and the layout component 4 used to build a user interface may be selected dynamically depending upon the user task to be accomplished.

Figure 4:
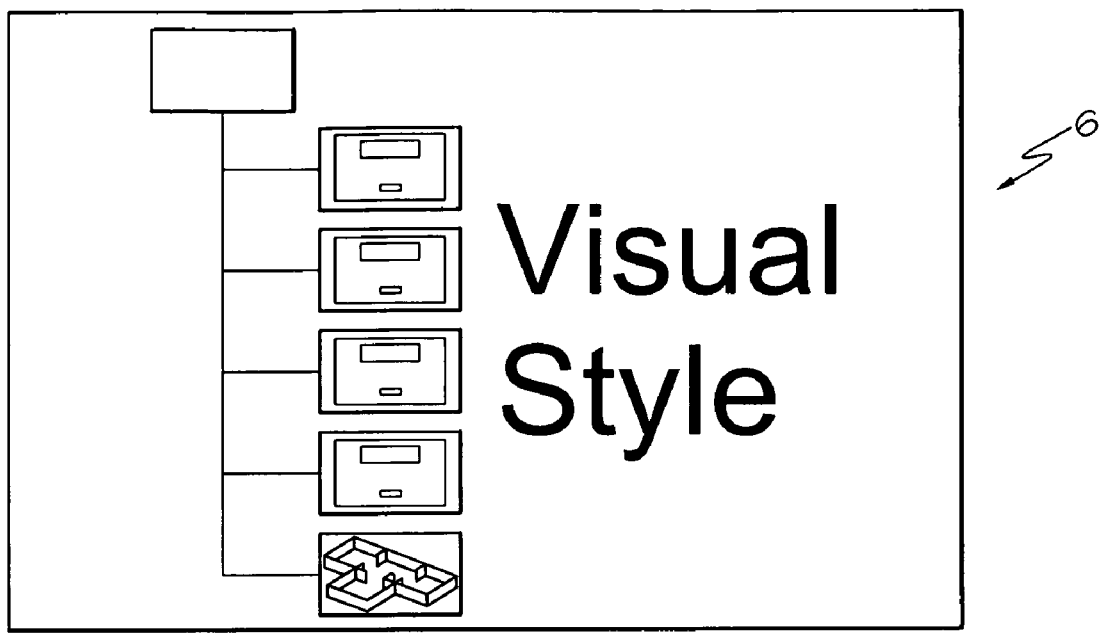
FIG. 4 is an illustration of a visual style aspect of the user interface in accordance with an embodiment the present invention.

Referring now to FIG. 4, the visual style component 6 carries the look of the user interface. This component is useful as the same content may need to have different representation within the overall user interface.

Figure 5:
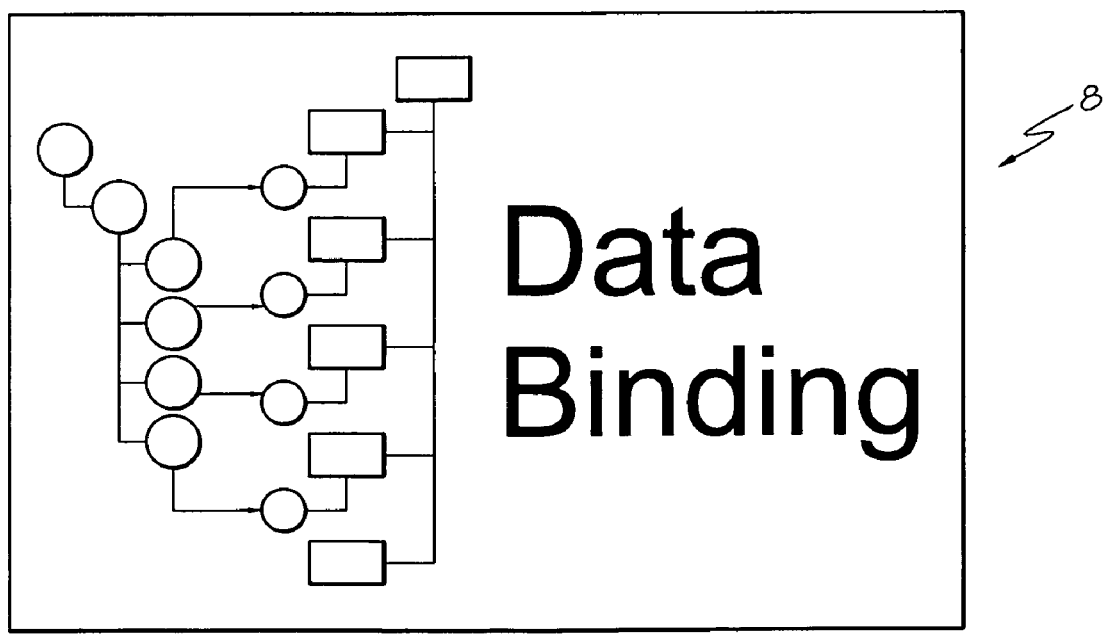
FIG. 5 is an illustration of a data binding aspect of the user interface in accordance with an embodiment the present invention.

In FIG. 5, the data binding component 8 is illustrated. The data binding component gives the user or selection system choices of inputs to make, commands to give or options to take. One simple example of data binding is to offer the choice of binding a textual enumeration of domains to 1) a set of radio buttons or 2) a drop-down menu from either of which a domain item may be selected. Overall the data binding component allows a user to create data, represent data, update data or delete data via the user interface.

Figure 6:
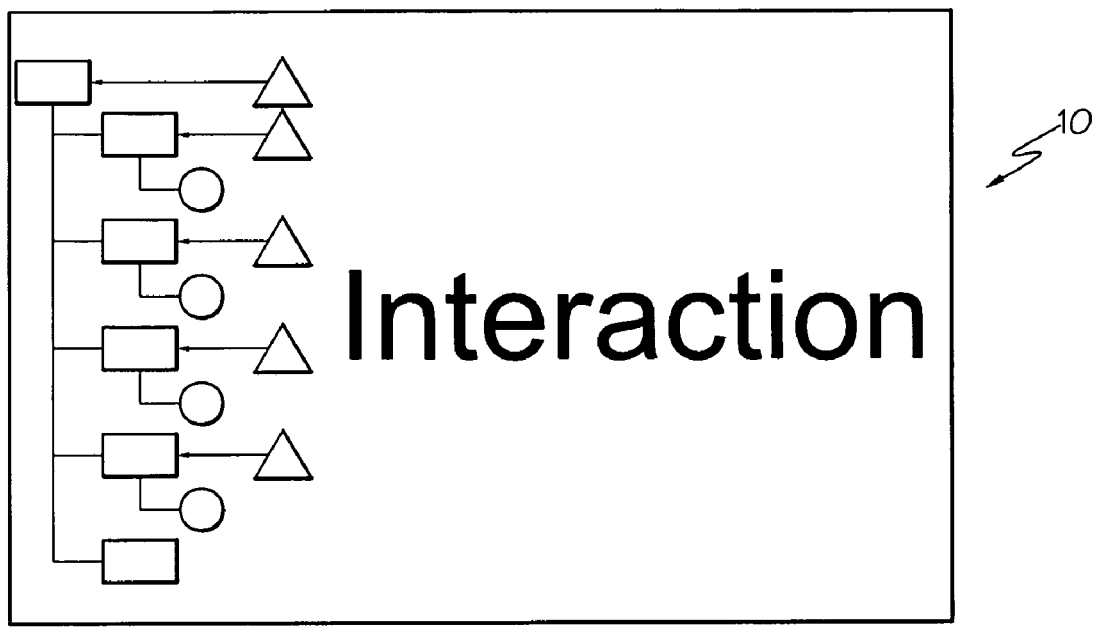
FIG. 6 is an illustration of an interaction aspect of the user interface in accordance with an embodiment the present invention.
Figure 7:
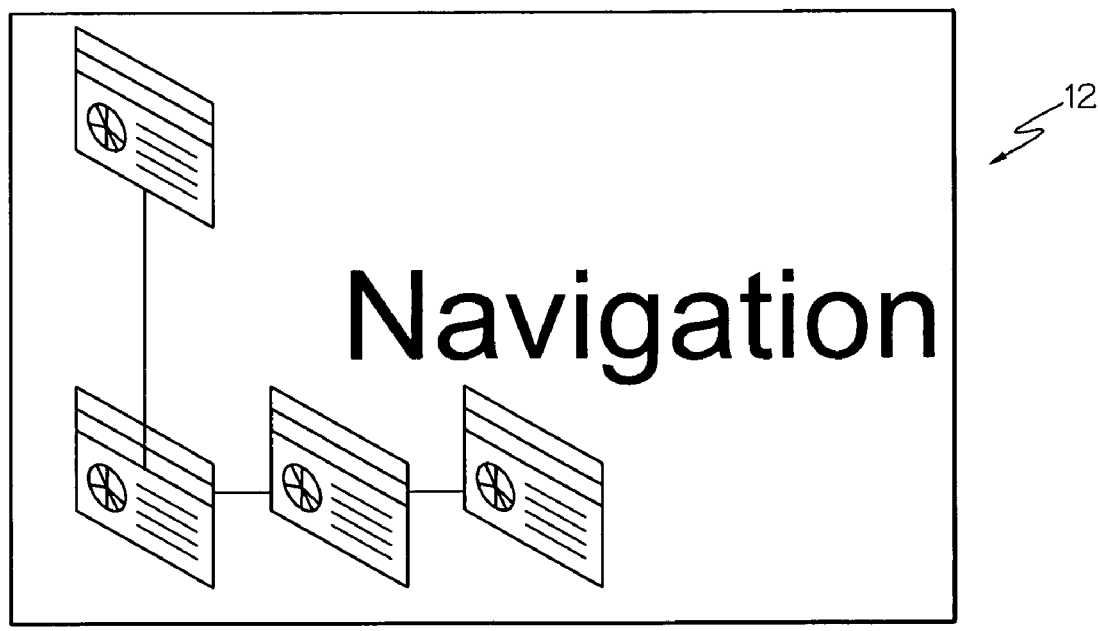
FIG. 7 is an illustration of a navigation aspect of the user interface in accordance with an embodiment the present invention.

In FIG. 6, the interaction component 10 allows a user to leverage all aspects of the user interface available which allows for greater control of system efficiency. One special interaction is the navigation component 12 shown in FIG. 7, which enables the user to interact with the system on different pages. For example, the navigation component 12 allows a user to move through user interface pages to view or interact with differing levels of detail about the information with which the user is working. Together, some or all of these components are set up in profiles to build a user interface that is scalable depending upon the capabilities of the server environment and the client side device.

According to the present invention a scalable user interface system can be provided by dividing the user interface components into two parts. First, the general reusable components such as those discussed above are defined and organized. Second, application specific user interface components are identified by application so that they can be called upon to build a user interface if required. With the components identified and defined, multiple profiles can be created for various operating environments of the particular client side devices. For each profile, the present invention contemplates that it would be useful to build reusable user interface components that can be used across multiple profiles. This component reuse increases system efficiency and makes it possible to support new or later added client side devices brought online into the computer system. With the profiles created, the user interface components known and cross-profile components built, user interface scalability strategies can be defined and are generally executed at the runtime task of building a user interface.

Figure 8:
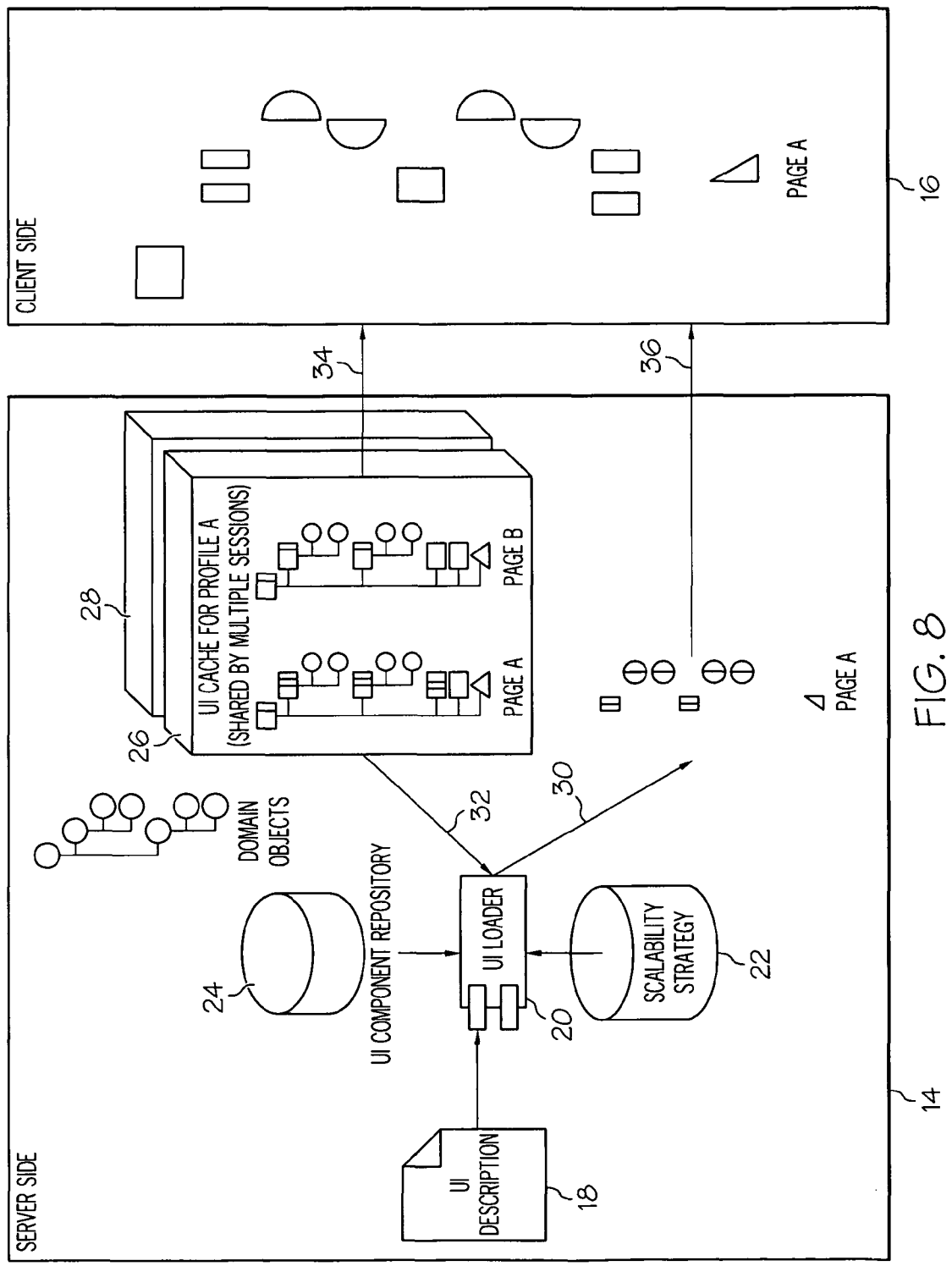
FIG. 8 is an illustration of a computer system in accordance with an embodiment the present invention.

Referring to FIG. 8, the apparatus and process for providing a scalable user interface can be explained. As shown in FIG. 8, a server 14 and client side device 16 are illustrated. By way of example, a user interface will be built for display on the client side device beginning with a user interface (UI) description 18. The UI description 18 defines the task(s) that need to be accomplished to build a user interface. The UI description 18 is loaded into a UI loader 20 which calls upon the scalability strategy that has been defined and stored for a profile (in this example profile A). The UI loader also checks for stored UI components in a repository 24, and if needed components are available, the UI loader 20 may reuse those components directly. As defined by the profile, the capabilities of the client side device 16 and the server 14 are known and the UI loader portions the task of building the user interface accordingly. For example, if the client side device is incapable of generating a certain UI component or image, that component can be built on the server side for transmission to the client side device. Thus, the present invention contemplates that the server 14 has server side components 20, 22 and 24 and generators of client side components 26 and 28. In a preferred embodiment, the generators of the client side components 26 and 28 are cached components that are shared by multiple client sessions. Thus, a first user and second user may make requests from different client side devices for the same UI object, (for example "Page A"). For the different users, Page A may display different contents responsive to their account/context, and perhaps different visual effects responsive to their client devices' capabilities. Thus for Page A's server side components, the common parts to all clients can be cached and shared (as in 26 or 28) and can be fetched for reuse through 32. The other server side parts, which are specific clients, can be generated through 30. In this way, the UI loader 20 positions components to be processed by the client side device 16 and positions components to be processed on the server side 32. Then the two parts of the user interface can then be sent to the client side device 34 and 36 for presentation on the client side device 16.

The present invention also contemplates that the UI loader 20 may discard certain UI components if the client side device is incapable of displaying the information. That is, the present invention provides that if the client side device is merely incapable of processing a component of a user interface, that task is performed on the server side affording the user of the client side device a richer and more functional user interface. However, if the client side device is incapable of presenting some portion of a UI component, even if that portion could be created on the server side, that portion is discard to increase efficiency by not wasting computing power on information that cannot be presented to the user. For example, if a portion of a user interface component was to present an audio file, a visual file and a text file, however, the client side device could only present text, the audio and visual files would be discarded for better memory management at the client side device and overall system efficiency. For a more complicated example, assume a situation where the user interface was to have a user select a painting from a collection of paintings and drag and drop the selected painting to a predetermined area of the user interface. However, while being able to support graphic display, assume the client side device could not support the animation or redrawing an image along a path for the drag operation, but rather could support mouse movement and mouse up/down operations, the result would be that the user interface build could be completed by the present invention, with only the mouse click, move and release, followed by a redrawing of the screen with the selected painted at the drop location occurring at the client side device. The dragging operation would be discarded user interface function or service provided to the user.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing a scalable user interface comprising the steps of:
    receiving a task to be completed, including the building of a user interface to be presented on a client side device, into a user interface loader;
    determining server capabilities required to accomplish the task utilizing the user interface loader;
    determining the client side device capabilities required to accomplish the task utilizing the user interface loader;
    providing reusable user interface components available for use in multiple profiles to the user interface loader, wherein the reusable interface components comprise a widget object component, a layout component, a visual style component, a data binding component, an interaction component and a navigation component, and wherein said multiple profiles comprise one or more user interface scalability strategies that are executed at runtime of building the user interface;
    defining a user interface description utilizing the reusable interface components;
    assigning responsibility for accomplishing portions of the task responsive to determining the server capabilities and the client side device capabilities utilizing said user interface loader by assigning components of the user interface to be built at the server or at the client side device responsive to profiles based upon the server capabilities and the client side device capabilities;
    building the user interface from the user interface description; and
    presenting the user interface on client side device to complete the task.

2. A computer system having a scalable user interface system, comprising:
    a plurality of client side devices at least some of which have different capabilities;
    a plurality of servers at least some of which have different capabilities and including a user interface generator responsive to a user interface description to apportion building a user interface based upon one or more profiles comprising user interface scalability strategies that are executed at runtime of building the user interface;
    user interface components stored in memory and available for use to build the user interface description, wherein the interface components comprise a widget object component, a layout component, a visual style component, a data binding component, an interaction component and a navigation component; and
    assigning said user interface components to be built at the server or at the client side device responsive to said profiles based upon the server capabilities and the client side device capabilities.

3. A method for providing a scalable user interface system, comprising the steps of:
    providing general reusable user interface components and application specific user interface components to a user interface loader;
    providing profiles for user interfaces based upon server capabilities and client side device capabilities to the user interface loader, wherein the profiles comprise one or more user interface scalability strategies;
    providing reusable user interface components available for use in multiple profiles to the user interface loader, wherein the reusable interface components comprise a widget object component, a layout component, a visual style component, a data binding component, an interaction component and a navigation component; and
    executing user interface scalability strategies at runtime to build a user interface description using the general user interface components and the reusable user interface components at a server and application specific user interface components available at a client side device.

4. A method for providing a scalable user interface system, comprising the steps of:
    receiving a user interface description defining a user interface to be built;
    apportioning building the user interface description between a server and a client side device responsive to one or more profiles based upon the server capabilities and the client side device capabilities, wherein said profiles comprise one or more user interface scalability strategies that are executed at runtime of building the user interface;
    using user interface components stored on the server to build a first portion of the user interface description at the server for transmission to the client side device, wherein the user interface components comprise a widget object component, a layout component, a visual style component, a data binding component, an interaction component and a navigation component;
    building a second portion of the user interface description at the client side device and combining the second portion with the first portion received from the server; and
    displaying the user interface on the client side device.

5. The method of claim 4, which includes the step of discarding user interface components not capable of being displayed on the client side device.

6. A computer system having a scalable user interface system, comprising:
    one or more client side devices with user interface presentation and/or interaction capabilities; and
    one or more servers with user interface support and/or interaction handling capabilities and including a user interface generator responsive to a user interface description to apportion building the user interface description at the server or at the client side device based upon one or more profiles based upon the server capabilities and the client side device capabilities, said profiles comprising user interface scalability strategies executed at runtime of building the user interface, wherein the user interface description is generated from reusable user interface components comprising a widget object component, a layout component, a visual style component, a data binding component, an interaction component and a navigation component.

* * * * *